Dec. 16, 1952 D. H. ANNIN 2,621,889
EXPANSIBLE SLEEVE TYPE VALVE
Filed May 23, 1947 3 Sheets-Sheet 1
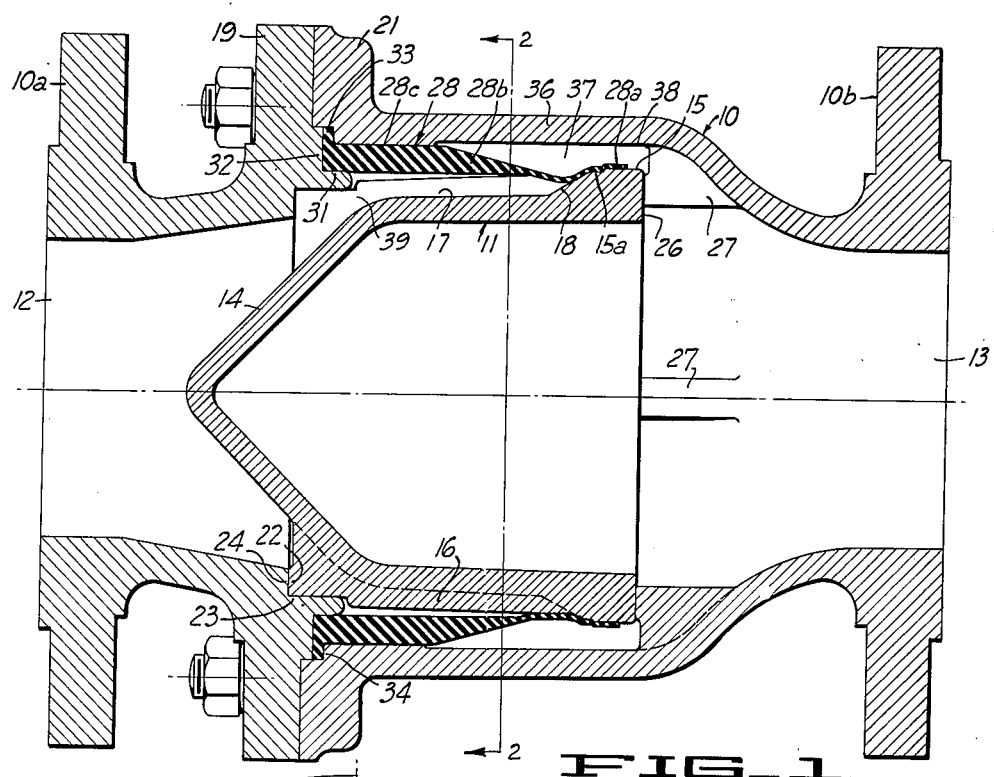
FIG_1_
FIG_2_
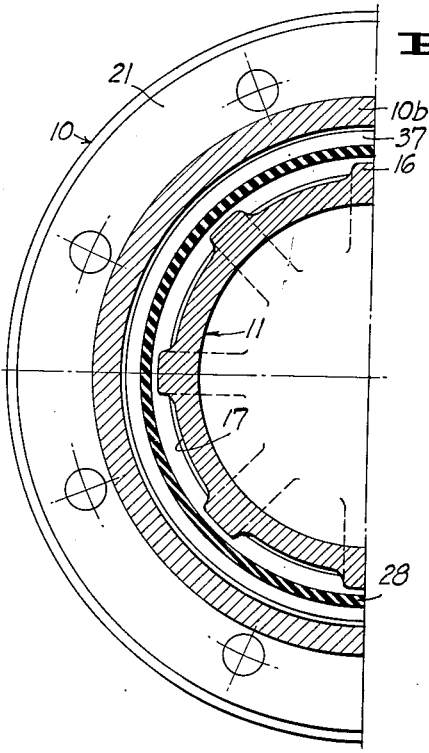
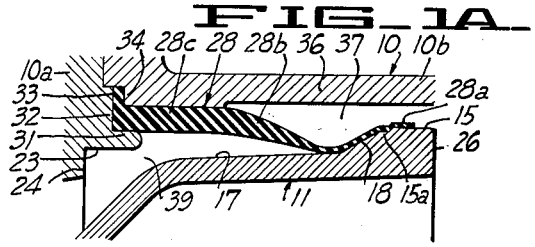
FIG_1A_
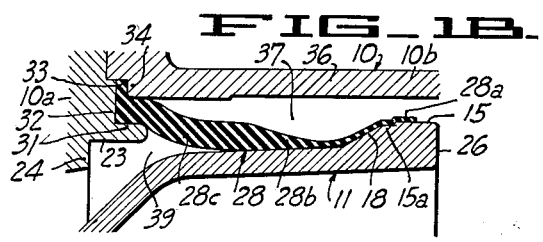
FIG_1B_
INVENTOR
Douglas H. Annin
BY
Paul D. Flehr
ATTORNEY Dec. 16, 1952 D. H. ANNIN 2,621,889
EXPANSIBLE SLEEVE TYPE VALVE
Filed May 23, 1947 3 Sheets-Sheet 2
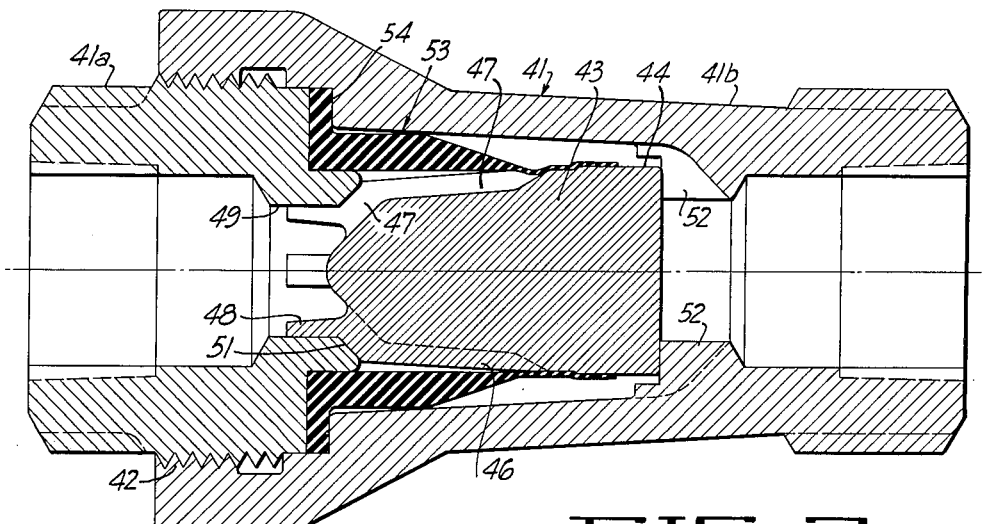
FIG_3_
FIG_4_
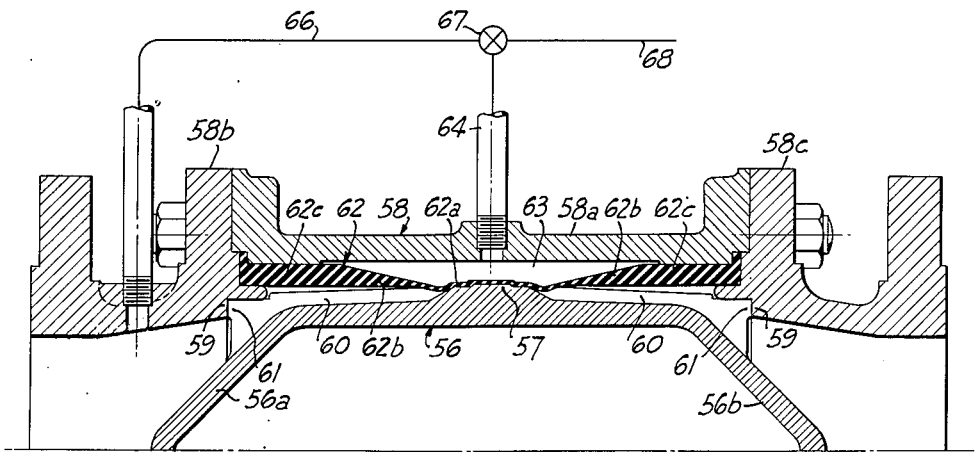
INVENTOR
Douglas H. Annin
BY
ATTORNEY Dec. 16, 1952  D. H. ANNIN  2,621,889
EXPANSIBLE SLEEVE TYPE VALVE
Filed May 23, 1947  3 Sheets-Sheet 3
FIG_5_
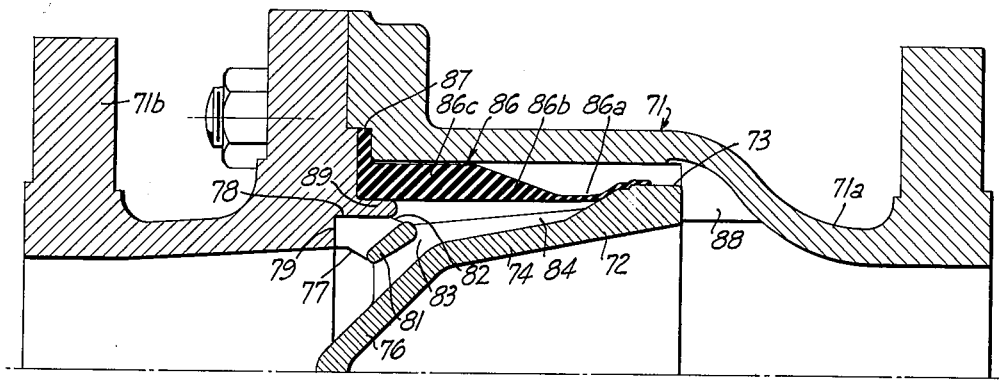
FIG_6_
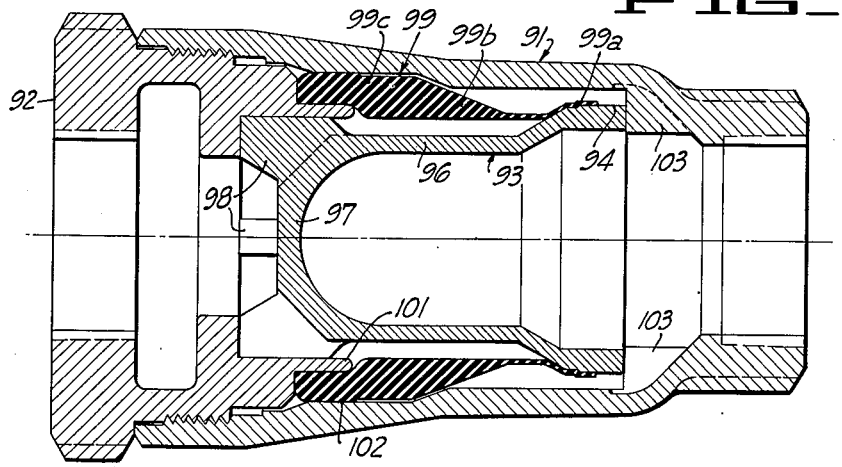
FIG_7_
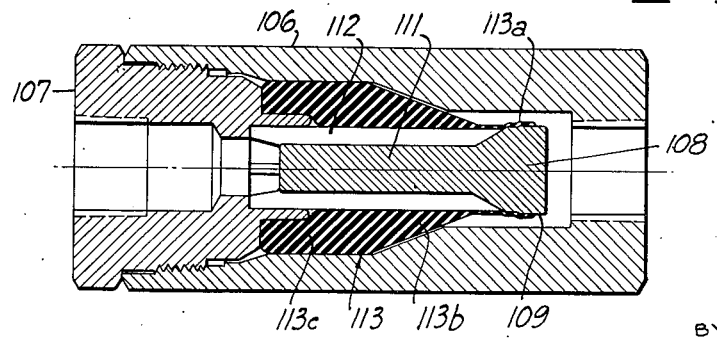
INVENTOR
Douglas H. Annin
BY
Paul D. Flehr
ATTORNEY Patented Dec. 16, 1952

2,621,889

UNITED STATES PATENT OFFICE 2,621,889

EXPANSIBLE SLEEVE TYPE VALVE

Douglas H. Annin, Oakland, Calif., assignor, by mesne assignments, to Grove Regulator Company, a corporation of California Application May 23, 1947, Serial No. 750,004

9 Claims. (Cl. 251—122)

This invention relates generally to the construction of fluid flow control valves.

In the past valves have been manufactured which employ an expansible sleeve or rubber tube adapted to seal upon a rigid inner barrier. Such valves for example are shown in Patents 2,331,291, 2,353,143, and 2,360,873, and are well suited for many services, particularly where it is desired to control flow of gas or liquid through a piping system from a remote control point. It is possible to use such a valve as a check valve which is opened by fluid pressure to permit flow in one direction, but which closes automatically to prevent back flow. However, such an arrangement is subject to the difficulty that considerable differential pressure is required to expand the rubber sleeve to open position, which necessarily limits the permissible field of application. In addition the metal cores used in the construction of the valves shown in the above mentioned patents make use of slots separated by bars and are relatively difficult and expensive to manufacture.

An ideal check valve applicable to a wide variety of services should open on relatively low differential pressure, and should be reliable in providing dead tight shut-off on back pressure. The flow passage or passages through the valve should be such as to offer the least amount of obstruction to the liquid or gas, and to minimize accumulation of solids which may be carried by the fluid. In addition it is desirable to maintain the construction as simple as possible, and to avoid use of parts which are difficult to manufacture.

It is a general object of the present invention to provide an improved check valve of the expansible rubber sleeve type, which will open upon application of a relatively low differential pressure, and which will afford dead tight shut-off against back flow.

Another object of the invention is to provide a check valve of the above type which is of great simplicity with respect to its mechanical construction, and which can be readily manufactured in quantities at a comparatively low cost.

Another object of the invention is to provide a check valve which readily lends itself to the use of special materials, such as Monel metal, stainless steel, glass, ceramic materials and the like, to suit the needs of various service requirements.

Another object of the invention is to provide a new and improved valve of the expansible rubber tube type which is characterized by a special sleeve or tube of tapered construction which cooperates with and makes possible the use of a special type of simplified core.

Another object of the invention is to provide a valve of the above character having a core of simple construction which avoids use of circumferentially spaced slots.

Another object of the invention is to provide a check valve which can withstand relatively high back pressures while at the same time opening on relatively low pressure differentials.

Additional objects of the invention will appear from the following description in which the preferred embodiments have been set forth in detail in conjunction with the accompanying drawing.

Referring to the drawing:

Figure 1 is a side elevational view in section illustrating a valve incorporating the present invention.

Figures 1a and 1b are details in section showing the rubber tube in two different operating positions.

Figure 2 is a cross sectional view taken along the line 2—2 of Figure 1.

Figure 3 is a side elevational view in section illustrating a modified construction.

Figure 4 is another side elevational view in section illustrating another embodiment of the invention.

Figure 5 is a side elevational view in section illustrating another embodiment of the invention adapted particularly for larger sized check valves.

Figure 6 is a side elevational view in section illustrating another embodiment of the invention in which the core ribs have been omitted.

Figure 7 is a side elevational view in section illustrating another embodiment of the invention suitable for use with check valves of relatively small size.

Referring first to the check valve embodiment illustrated in Figures 1 and 2, the invention consists of a body 10 in conjunction with a core 11. The body is provided with inflow and outflow passages 12 and 13, which together with the body, may conveniently be annularly contoured. Core 11 is formed of suitable rigid material of proper strength, such as cast iron, cast steel, stainless steel, etc. It forms a central barrier in the body and to facilitate manufacture it can be hollow as illustrated with its closed end portion 14 faced toward the inlet passage 12. A peripheral annular area 15 of the barrier is machined and serves as a seating surface in a manner to be presently explained. The periphery of the body carries a plurality of circumferentially spaced ribs 16 having their outer edges on a diameter which is preferably slightly less than the diameter of annular area 15. The spaces 17 between these ribs form ducts or passages for flow of fluid as will be presently explained. By virtue of the beveling 18 the end portions of ducts 17 are tapered (with respect to the radial dimension) toward the annular area 15.

To facilitate assembly and manufacture the body 10 is preferably formed in two parts 10a and 10b. These parts are suitably attached together as by means of the mating flanges 19, 21. Various means can be utilized to retain the core in proper position within the body, but in the embodiment illustrated the ribs have end lug or web portions 22 which terminate in a common plane, and which fit within the body bore 23 and abut the body shoulder 24. The remote end face 26 of the core is engaged by a plurality of circumferentially spaced lugs 27, which are carried by the body part 10b. Thus when the two parts of the valve body are clamped together the core is firmly clamped within the body and held with its longitudinal axis coincident with the longitudinal axis of the body.

Disposed about the core there is a tube 28 formed of suitable resilient material such as natural or synthetic rubber. In this embodiment the end portion 28a of the tube is of relatively thin wall section and is adapted to seal upon the annular area 15 of the core. When the tube 28 is relaxed (no differential pressures applied) it is desirable that portion 28a be slightly stretched whereby it is retained in sealing contact with the core. Portion 28b of the tube is of increasing or tapered wall thickness, commencing at a region spaced from but near the area 15 and extending to the portion 28c of the tube. Portion 28c has a relatively thick wall section.

The thick or heavy tube portion 28c is suitably sealed and anchored to the body. Thus it is shown fitted over a machined annular surface 31 formed upon the body part 10a, and has its end face abutting an annular shoulder 32 on the same body part. It also has an annular flange 33 formed integral with the tube, and which is gripped between the annular area 32, and the annular area 34 formed on body part 10b.

That portion of the body wall indicated generally at 36 and which surrounds the portions 28a, 28b of the tube 28 is proportioned to provide a limiting clearance or space 37 when the tube is relaxed as illustrated. This clearance is of limited dimensions in the region of the barrier 16, whereby for high flow rates through the valve the thin walled portion 28a of the tube is limited in its expansion by contact with the adjacent housing wall 38. In general it has been found that too great a clearance about the area 15 may result in undesired fluttering of the thin walled tube portion 28a under high flow rates. Too small a clearance on the other hand tends to limit the capacity of the valve. In practice it has been found satisfactory to provide a clearance of the order of 1/20th the diameter of the area 15, for valves ranging in pipe size from 1.5 to 12 inches. The diameter of area 15 for the various sizes can be of the order of 1.5 times the pipe size for which the valve is to be used. For example for an area 15 which has a diameter of the order of 4.656 inches, the clearance can be of the order of 0.23 inch.

To facilitate a fluid tight seal it is desirable to provide an annular shoulder 15a on the sealing surface 15, whereby the thin walled tube portion 28a is pressed over the relatively abrupt edge of the shoulder. In practice the shoulder is formed by turning down or otherwise reducing the diameter of area 15 a slight amount on the inlet margin of the same.

Operation of the above valve can be explained as follows: Assuming connection of the body to inflow and outflow piping, when the fluid pressures in the inflow and outflow passages are equal the tube 28 takes a relaxed position substantially as illustrated. At this time the thin walled portion 28a is slightly stretched whereby it is retained in sealing engagement with the annular area 15 of the core. When the pressure in the inflow passage exceeds the outflow pressure, pressure differential tends to expand the tube, but such expansion is largely confined substantially entirely to the relatively pliable thin walled end portion 28a. With an increase in the flow rate the thin walled portion of the tube expands to a greater diameter. For very high flow rates all of the free portions of the tube, including portions 28a and 28b, may be pressed outwardly into contact with the body wall portion 36.

When the pressure differential drops below that required to expand and hold the tube open, it contracts and the thin wall section 28a establishes sealing contact with area 15 and with the edge of shoulder 15a. When a reverse pressure differential is applied, that is when the pressure on the outlet 13 exceeds the inlet pressure, the tube portion 28a is pressed more tightly into sealing contact with the core area 15. As the back pressure differential increases the tube progressively collapses along the core and over the ribs 16, the progression being from the thin walled right hand end as illustrated in Figure 1, toward the thick walled portion 28c. Figure 1a shows the position of the tube for a back pressure sufficient to collapse a part of tapered tube portion 28b. When the back pressure differential reaches the maximum for which the valve is constructed, the thick walled portion of the tube is pressed against the core in such a manner as to bridge or span across the annular region 39, as shown in Figure 1b. In explanation of the appended claims this region may be said to form an annular orifice area between the core and the body, and which is spaced from the sealing area. It is desirable that the wall thickness of tube portion 28c be of the order of and preferably somewhat greater than the width of space 39, whereby for the position shown in Figure 1a it is capable of affording utmost strength against back pressure.

The advantages of the above valve will be apparent from the foregoing. The core construction is relatively simple and completely eliminates the necessity of forming slots. Relatively large flow passages are provided about the core whereby the valve tends to pass solids carried by the fluid without clogging. The ribs insure collapsing of the tube upon the core without formation of undesired folds or wrinkles, which would tend to occur in collapsing of tubes of the larger sizes upon a plain cylindrical surface. A relatively small differential is required to open the valve due to the fact that the thin wall portion 28a is highly pliable and this characteristic is obtained in conjunction with the fact that the valve can be designed to withstand relatively high back pressures. Under high flow rates turbulence is not excessive and the pressure drop under such conditions is not serious. The thin wall portion of the resilient tube is capable of maintaining good sealing contact with the core at all times, irrespective of the presence of grit or like foreign material and high back pressures do not tend to dislodge it from sealing position.

Figure 3 illustrates a modified form of check valve suitable particularly for valves of the smaller sizes. The body 41 in this instance is formed of the two parts 41a and 41b which have a threaded connection 42. The core 43 is of solid construction and can be formed for example as a casting or of bar stock. The formation of the core is generally similar to the core illustrated in Figure 1, whereby an annular seating area 44 is provided, and also circumferentially spaced ribs 46 which provide between them the ducts 47. Ribs 46 in this instance also have lug extensions 48 on the inflow side which fit within a bore 49 in the body part 41a. Also the faces 51 of the ribs are formed on a bevel to abut a complementary bevel formed on the body part 41a. Spaced lugs 52 are formed on the body part 41b and engage the adjacent end of the core to clamp the core between the two body parts. The expansible resilient tube 53 is formed similar to the tube 26 of Figure 1 and is provided with a flange 54 which is clamped between the two parts of the body. Operation of the modification shown in Figure 3 is the same as previously described with reference to Figures 1 and 2.

Figure 4 illustrates another embodiment of the invention in which a fluid space is provided about the resilient tube for receiving controlling fluid under pressure. Thus in this instance the core 56 has a central annular sealing area 57, and the annular end core portions 56a and 56b, each of which are provided with the circumferentially spaced ribs 60. The body 58 is shown formed in three parts 58a, 58b and 58c, suitably clamped together as by coupling flanges. The body parts 58b and 58c have annular shoulders 59 engaging the ends 61 of the ribs. The resilient rubber tube 62 has a portion 62a which seals upon the annular area 57, a tapered portion 62b, and thickened portion 62c. A closed fluid chamber 63 is formed within the body and about the resilient tube. This chamber is connected to an external pipe 64 whereby fluid under pressure can be applied, such as the upstream line pressure. A small control line 66 is shown connected to the inflow passage of the valve and connects with pipe 64 through the small pilot or control valve 67. When valve 67 is turned to apply the upstream pressure to the chamber 63, inflow pressure is consequently applied about the resilient tube to retain the same closed and sealed upon the annular area 57. However when pilot valve 67 is turned to interrupt communication with the inflow side of the valve and to vent pipe 64 to the atmosphere or to the downstream side as indicated by pipe 68, the tube expands to permit flow about the core and the annular area 57.

The operation of the resilient tube and its cooperation with the core in this embodiment is similar to the previous modifications. Here again the thickened wall portions 62c enable application of relatively high pressure differentials.

In the operation of the embodiment shown in Figure 4 the tube flexes in the same manner as previously described for Figures 1 to 3 inclusive. That part of the flexible tube on the outflow side of the sealing area 57 receives the full inlet pressure and therefore collapses upon the core to an extent dependent upon the pressures applied. By operation of the pilot valve 67, the valve can be opened and closed as desired. A valve of this character can be used with a suitable fluid operated pilot to operate as a pressure relief valve, a pressure reducing regulator, or a back pressure regulator.

Figure 5 illustrates another embodiment of the invention which is particularly well adapted for use with check valves of the larger sizes, as for example valves of a pipe size from two and one-half to ten inches or more. In this instance the body 71 is formed similar to Figure 1 and consists of the two parts 71a and 71b. The inner core 72 includes the cylindrical sealing area 73, a portion 74 which is generally conical shaped and which extends from the sealing area toward the inlet of the valve, and a conical shaped end portion 76 which forms the inlet or upstream end of the core. Circumferentially spaced webs 77 correspond to the portions 22 of Figure 1, and engage the machined surfaces 78 and 79 of the body part 71b. Webs 77 also serve to mount an annular ring 81 which is disposed intermediate the core and the adjacent portion of the body. Thus in place of one annular orifice area 39 as in Figure 1, this construction provides two annular orifice areas 82 and 83 upon both sides of the ring 81.

Ribs 84 are also provided upon the exterior of the core, corresponding to the ribs 16 of Figure 1, but in this instance the ribs are of considerably lesser relative height, whereby they are not engaged by the rubber tube until the tube has been contracted to a considerable extent by back pressure. The rubber tube 86 in this instance consists of a relatively pliable and thin wall section 86a, the tapered wall section 86b and the relatively thick wall section 86c. The tube is also provided with a flange 87 for clamping and sealing between the two body parts 71a and 71b. The core is normally held in position by lugs 88 formed on the body part 71a, and engaging the adjacent end of the core.

Operation of the valve shown in Figure 5 is generally the same as that of Figure 1. Relatively small differential pressure suffices to expand the thin wall section 86a to permit flow through the valve. When the differential pressure drops below that required to open the valve, this wall portion 86a contracts or collapses into sealed engagement with the annular area 73. As back flow pressure is applied to the valve the tube progressively collapses upon the core as the back pressure increases, and for extreme back pressure the thick wall portion 86c is finally forced to a position spanning the two annular areas 82 and 83 and supported by the core, by the end of the ring 81, and by the annular lip 89 on the body. Therefore it is apparent that relatively high back pressure can be successfully held by the valve, while at the same time a relatively good effective flow area is provided between the core and the body.

Figure 6 illustrates a simplified check valve incorporating the invention, and is somewhat similar to the valve of Figure 3. The body part 91 in this instance is threaded to receive the fitting 92, which forms the inlet for the valve. The core 93 in this instance is formed to provide the annular sealing area 94, the substantially cylindrical portion 96, and the inlet end portion 97. Lugs or webs 98 are attached to the core and are seated within the fitting or body part 92. The rubber tube 99 consists of the thin wall portion 99a, the tapered wall portion 99b, and the relatively thick wall portion 99c. The flange 54, shown in Figure 3, is omitted in this instance, and the thick wall portion 99c is gripped between the annular lip or rim 101 provided on the body part 92, and the adjacent cylindrical surface 102 formed on the body part 91. Lugs 103 serve to normally urge the core into its operating position.

One difference between the core of Figure 6 and the core illustrated in Figure 3 is that the ribs 46 have been omitted. It has been found that these ribs are not necessary for valves of the smaller sizes, as for example valves less than two and one-half inches in pipe diameter, while for the larger sized valves they serve the useful purpose of preventing undesirable wrinkling of the tube as it collapses upon the core. The valve of Figure 6 operates in substantially the same manner as the check valves previously described.

The modification of Figure 7 is likewise adapted for the construction of smaller valves. In this instance the body parts 106, 107 have threaded engagement, and the core 108 is constructed with an enlarged down stream end portion which provides the sealing area 109 and the substantially uniform portion 111. The core carries ribs 112 which extend to the inlet end of the core and are fitted within the body part 107. The tube 113 is substantially the same as the tubes previously described, consisting of the thin wall portion 113a, the tapered portion 113b and the relatively thick wall portion 113c.

A core of the construction illustrated in Figure 7 is well suited for manufacture from a variety of materials such as metal bar stock, die castings, glass or ceramic materials. If desired the ribs 112 can be omitted, and the core provided with ribs or lugs of sufficient length for seating within the body part 107.

This application is a continuation-in-part of my co-pending application Serial Number 678,467, filed June 21, 1946.

I claim:

1. In a check valve, a body having inlet and outlet passages, a rigid core mounted within the body and interposed between the passages, said core forming a barrier about which line flow must occur and having an annular sealing area formed on the periphery of the outlet end portion of the core, orifice means formed adjacent the inlet end portion of the core and serving to permit flow from the inlet passage through the region surrounding the sealing area of the core, the body of said core providing a peripheral surface extending for a substantial distance between said orifice means and said sealing area, and a resilient tube disposed within the body and about the core, the outlet end of said tube comprising a relatively thin and pliable wall portion normally contracted in sealing engagement with said annular sealing area, the other end portion of the tube adjacent the region of the orifice means having relatively thick walls and being sealed with respect to the body, the tube having a tapered wall portion connecting the thin wall portion with the thick wall portion and extending generally about said peripheral surface of the core, said tapered and thick walled portions of the tube being normally spaced from said peripheral surface of the core to form a space for fluid flow, said space being in communication through orifice means with the inlet passage in a region generally embraced by the thick walled portion of the tube, the body being formed to provide an annular space about the tube which is in communication with the outlet passage, the tube being adapted to progressively collapse upon the core upon application of back pressure to the outlet, with the thick wall portion of the tube closing upon said orifice means for extreme backflow pressures, said thin wall portion of the tube being relatively expansible upon application of pressure to the inlet of the valve for permitting flow therethrough.

2. A check valve as in claim 1 in which said orifice means is an annular orifice at the inlet end of the core and between the core and the body and in which an annular ring is provided and is disposed intermediate said core and the body in the region of said orifice means, said ring serving to aid in supporting the thick wall portion of the tube upon application of extreme back pressure.

3. In a valve, a body having inlet and outlet passages, a core mounted within the body and interposed between the passages, said core being formed to provide a barrier about which the line flow must occur, said core also being formed to provide an annular sealing area on the periphery of one end thereof, orifice means formed adjacent the inlet end portion of the core, said orifice means serving to connect the inlet passage with the space about the core and being spaced longitudinally from the sealing area, a resilient tube disposed within the body and about the core, said tube comprising a relatively thin and pliable wall portion normally contracted upon and sealed with respect to said annular sealing area, a relatively thick wall portion sealed with respect to the body and disposed to generally embrace said orifice means, and a tapered wall portion connecting the thin wall portion with the thick wall portion, the body serving to provide an annular space about the tube to enable expansion of the same to permit flow of fluid about the core, the outer periphery of said core providing an imperforate peripheral surface extending between the sealing and orifice means and spaced inwardly from the thick and tapered portions of the tube, and a plurality of circumferentially spaced ribs mounted on said surface and extending between said annular sealing area and the orifice area, application of external pressure to said tube serving to cause collapsing of the same upon the peripheral core surface and said ribs with a bridging of the wall portion across said orifice area, said ribs serving to prevent wrinkling of the core.

4. In a valve, a body having inlet and outlet passages, a core mounted within the body and interposed between said passages, said core being formed to provide a barrier about which line flow must occur, said core also being formed to provide an annular sealing area on the periphery of one end thereof, a generally annular orifice area formed between the other end portion of the core and the body, said orifice area serving to connect the inlet passage with the space about the core and being spaced longitudinally from the sealing area, a resilient tube disposed within the body and about the core, said tube comprising a relatively thin and pliable wall portion normally contracted upon and sealed with respect to said annular sealing area, a relatively thick wall portion sealed with respect to the body and disposed to generally embrace said orifice area, and a tapered wall portion connecting the thin wall portion with the thick wall portion, the body serving to provide an annular space about the tube to enable expansion of the same to permit flow of fluid about the core, the outer periphery of the core providing a substantially imperforate surface extending between the sealing area and said orifice areas, said surface being generally smaller in diameter than the diameter of the sealing area and being generally embraced by the tapered portion of the tube, and a plurality of circumferentially spaced ribs mounted on said imperforate surface and extending from said annular area to said orifice area, application of external pressure to said tube serving to cause collapsing of the same upon the imperforate core surface and upon said ribs with a bridging of the thick wall portion across said orifice area, said ribs serving to prevent wrinkling of the tube.

5. A valve as in claim 4 together with an annular member disposed within said orifice area, said member serving to aid in the support of said tube under conditions of extreme back pressure.

6. In a valve, a body formed of two parts removably attached together, said body parts forming inlet and outlet passages in substantial alignment, a core mounted within the body and interposed between the passages, said core being formed to provide a barrier about which the line flow must occur, said core also being formed to provide a peripheral annular sealing area on one end of the same, said core being formed to provide orifice means adjacent the other end portion of the core, said orifice means serving to connect the inlet and outlet passages with a space about the core, a resilient tube disposed within the body and about the core, one end of the tube being clamped between the two parts of the body and sealed with respect to the same about the core, the other end of the tube being adapted to seal upon the annular sealing area of the core, lugs formed on the other end portion of the core and engaging one part of the body, and lugs formed on the other part of the body and having clamping engagement with said one end of the core to retain the core against longitudinal displacement.

7. In a check valve, a body having inlet and outlet passages, a rigid core mounted within the body and interposed between the passages, said core forming a barrier about which line flow must occur and having an annular sealing area formed on the periphery of the outlet end portion of the core, said core providing a peripheral surface extending between the sealing area and the inlet end of the core, and a resilient sealing tube disposed within the body and about the core, said tube having one relatively thin and pliable end wall portion which is normally substantially cylindrical and contracted upon and sealed with respect to said annular area, the other end portion of the tube having relatively thick walls and being sealed with respect to the body, the tube having a tapered wall portion connecting the thin wall portion with the thick wall portion, both said thick and thin walled portions generally embracing said peripheral surface and normally spaced therefrom to form a space for fluid flow, orifice means for conducting fluid flow from the inlet passage to said space, said orifice means being generally embraced by the thick walled portion of the tube and spaced from said sealing area, the body being formed to provide an annular space about the tube which is in communication with the outlet passage, said tube being adapted to progressively collapse upon the core upon application of back pressure to the outlet passage, with the thick wall portion of the tube closing on said orifice means for extreme back flow pressures, said thin walled portion of the tube being readily expansible upon application of pressure to the inlet passage of the valve for permitting flow therethrough.

8. In a valve, a body having inlet and outlet passages, a core mounted within the body and interposed between the passages, said core being formed to provide a barrier about which the line flow must occur, said core also being formed to provide an annular sealing area on the periphery of one end thereof, a generally annular orifice area formed between the other end portion of the core and the body, said orifice area serving to connect the inlet passage with the space about the core and being spaced longitudinally from the sealing area, a resilient tube disposed within the body and about the core, said tube comprising a relatively thin and pliable wall portion adapted to contact and seal upon said annular sealing area, a relatively thick wall portion sealed with respect to the body and disposed adjacent said orifice area, and a tapered wall portion connecting the thin wall portion with the thick wall portion, the body serving to provide an annular space about the tube to enable expansion of the same to permit flow of fluid about the core, the outer periphery of said core being provided with a plurality of circumferentially spaced ribs extending between said annular area and the orifice area, application of external pressure to said tube serving to cause collapsing of the same upon the core and said ribs with a bridging of the wall portion across said orifice area, said ribs serving to prevent wrinkling of the core.

9. In a valve, a body formed of two parts removably attached together, said body parts forming inlet and outlet passages in substantial alignment, a core mounted within the body and interposed between the passages, said core being formed to provide a barrier about which the line flow must occur, said core also being formed to provide an annular sealing area on its periphery, said core being proportioned to form an orifice area between the core and the body, said orifice area serving to connect the inflow and outflow passages with a space about the core, a resilient tube disposed within the body and about the core, one end of the tube being clamped between the two parts of the body and sealed with respect to the same about the core, the other end of the tube being adapted to seal upon the annular area of the core, lugs formed on the core and engaging one part of the body, and lugs formed on the other part of the body and having clamping engagement with the core to retain the core against longitudinal displacement.

DOUGLAS H. ANNIN.

REFERENCES CITED

The following references are of record in the file of this patent:

UNITED STATES PATENTS

| Number | Name | Date |
| --- | --- | --- |
| 2,317,376 | Grove | Apr. 27, 1943 |
| 2,374,989 | Funk | May 1, 1945 |
| 2,395,906 | Owens | Mar. 5, 1946 |

FOREIGN PATENTS

| Number | Country | Date |
| --- | --- | --- |
| 1,426 | Great Britain | of 1867 |
| 333,276 | Germany | of 1921 |
| 571,874 | Germany | of 1933 |